US012754589B2

(12) United States Patent
Ho et al.

(10) Patent No.: US 12,754,589 B2
(45) Date of Patent: Oct. 6, 2026

(54) DISPLAY DEVICE AND FLEXIBLE FRAME

(71) Applicant: GIGA-BYTE TECHNOLOGY CO., LTD., New Taipei City (TW)

(72) Inventors: Jui-Fong Ho, New Taipei City (TW); Te-Shih Chin, New Taipei City (TW)

(73) Assignee: GIGA-BYTE TECHNOLOGY CO., LTD., New Taipei City (TW)

( * ) Notice: Subject to any disclaimer, the term of this patent is extended or adjusted under 35 U.S.C. 154(b) by 66 days.

(21) Appl. No.: 18/778,867

(22) Filed: Jul. 19, 2024

(65) Prior Publication Data

US 2025/0036165 A1 Jan. 30, 2025

(30) Foreign Application Priority Data

Jul. 28, 2023 (TW) ................................. 112128396

(51) Int. Cl.
*G06F 1/16* (2006.01)

(52) U.S. Cl.
CPC .......... *G06F 1/1656* (2013.01); *G06F 1/1686* (2013.01)

(58) Field of Classification Search
None
See application file for complete search history.

(56) References Cited

U.S. PATENT DOCUMENTS 6,417,884 B1 * 7/2002 Chang ................... G06F 1/1686 348/376
2013/0077017 A1 3/2013 Aoki et al.
2019/0033686 A1 * 1/2019 Kinoshita ............ G03B 11/043
2021/0034109 A1 * 2/2021 Torres ................... G06F 1/1616
2022/0163869 A1 * 5/2022 Niu ....................... G06F 1/1616
2023/0027221 A1 * 1/2023 Ushio .................... G06F 1/1686
2024/0045472 A1 * 2/2024 Kinoshita ............ G06F 1/1652

FOREIGN PATENT DOCUMENTS

CN 209297645 U 8/2019
CN 211959383 U 11/2020
EP 3 343 275 B1 6/2019
JP 2013073009 A 4/2013
TW M581713 U 8/2019

OTHER PUBLICATIONS

TW Office Action dated Oct. 29, 2024 in application 112128396.
Extended European Search Report dated Dec. 23, 2024 as received in Application No. 24190006.7.
AU Examination Report dated Jan. 9, 2026 in application No. 2024205019.

* cited by examiner

*Primary Examiner* — James Wu
*Assistant Examiner* — Christopher L Augustin
(74) *Attorney, Agent, or Firm* — Maschoff Brennan

(57) ABSTRACT

A display device and a flexible frame. The display device includes a housing, a display panel, a flexible frame and a covering body. The flexible frame includes a first fitting body, two second fitting bodies and a covering body. The two second fitting bodies are connected to two opposite ends of the first fitting body, respectively. The first fitting body and the two second fitting bodies together from an installation space, and the display panel is located in the installation space. The covering body protrudes from a side of the first fitting body that is located away from the installation space and has at least one exposing hole. The capturing assembly is disposed on the housing. The first fitting body and the covering body cover different sides of the capturing assembly, respectively. The exposing hole exposes the capturing assembly.

9 Claims, 19 Drawing Sheets

DISPLAY DEVICE AND FLEXIBLE FRAME

CROSS-REFERENCE TO RELATED APPLICATIONS

This non-provisional application claims priority under 35 U.S.C. § 119 (a) on Patent Application No(s). 112128396 filed in Taiwan, R.O.C. on Jul. 28, 2023, the entire contents of which are hereby incorporated by reference.

TECHNICAL FIELD

The disclosure relates to an electronic device and a flexible frame, more particularly to a display device and a flexible frame fitting a display panel.

BACKGROUND

Laptop computers have become one of the electronic products that are widely used due to their portability. Recently, the display of the laptop computer usually features a thin bezel design, so as to be thin and lightweight while having increased screen-to-body (STB) ratio and improved visual appeal. To further slim down the display bezel, some manufactures have relocated the camera to the bottom side of the display closer to the hinge.

However, placing the camera on the side of the display closer to the hinge limits the capture range and angle of the camera. In this way, the camera may be unable to capture desired images. Due to the above reasons, it is difficult for conventional laptop computers to adopt thin bezels without reducing the range and angle for the camera to capture images.

SUMMARY

The disclosure provides a display device and a flexible frame that enable the display device to adopt a thin bezel design while preventing the range for the capturing assembly to capture signals from being reduced.

One embodiment of this disclosure provides a display device including a housing, a display panel, a flexible frame and a covering body. The housing has an accommodation space. The display panel is located in the accommodation space. The flexible frame includes a first fitting body, two second fitting bodies and a covering body. The two second fitting bodies are connected to two opposite ends of the first fitting body, respectively. The first fitting body and the two second fitting bodies together from an installation recess, and the display panel is located in the installation recess. The covering body protrudes from a side of the first fitting body that is located away from the installation recess and has at least one exposing hole. The capturing assembly is disposed on the housing. The first fitting body and the covering body cover different sides of the capturing assembly, respectively. The at least one exposing hole exposes the capturing assembly.

Another embodiment of this disclosure provides a flexible frame including a first fitting body, two second fitting bodies and a covering body. The two second fitting bodies are connected to two opposite ends of the first fitting body, respectively. The first fitting body and the two second fitting bodies together form an installation recess. The covering body protrudes from a side of the first fitting body that is located away from the installation recess and has at least one exposing hole.

According to the display device and the flexible frame disclosed by above embodiments, since the flexible frame includes the covering body protruding outwards and covering the capturing assembly, the capturing assembly is allowed to be moved from a side of the housing that is located closer to the hinge to the position adjacent to the covering body of the flexible frame that is in the form of a thin bezel. Accordingly, the capturing assembly is allowed to be disposed on the top part of the display device to prevent the range for the capturing assembly to capture signals from being reduced. In this way, the flexible frame allows the display device to adopt a thin bezel design while preventing the range for the capturing assembly to capture signals from being reduced.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
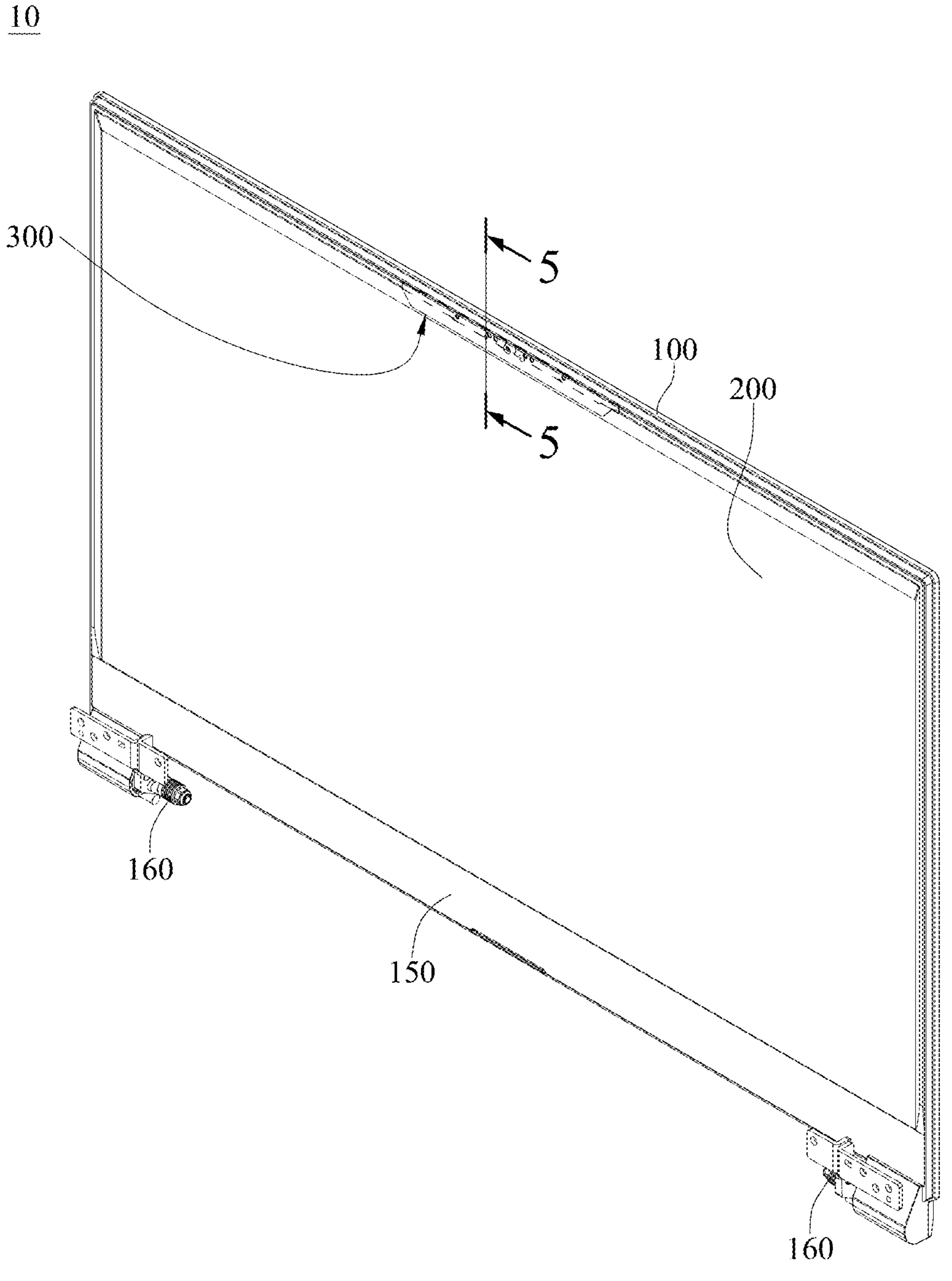
FIG. 1 is a perspective view of a display device according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
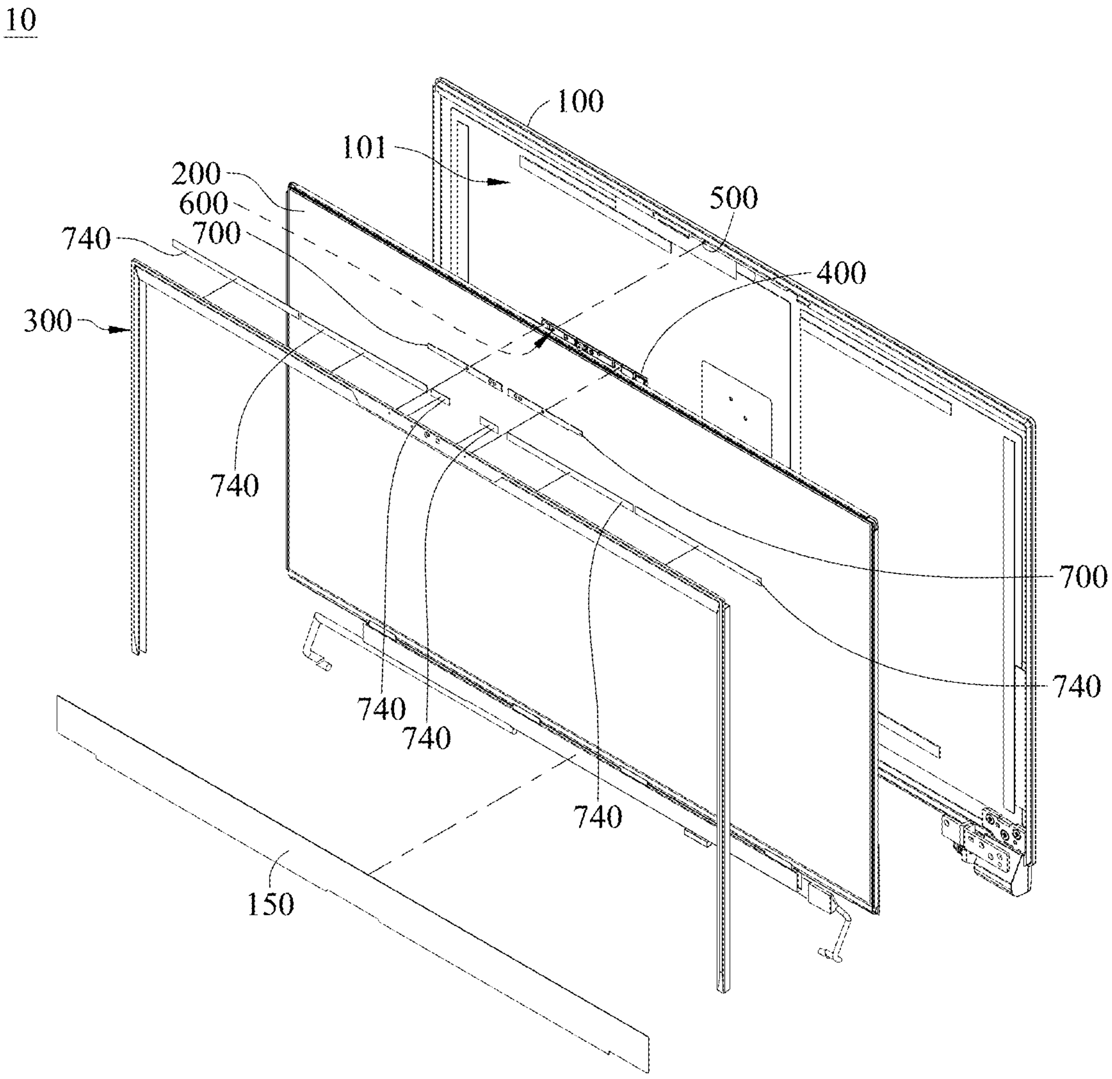
FIG. 2 is an exploded view of the display device in FIG. 1.

Please refer to FIGS. 1 to 2. FIG. 1 is a perspective view of a display device 10 according to a first embodiment of the disclosure. FIG. 2 is an exploded view of the display device 10 in FIG. 1.

The display device 10 may, but not limited to, be a part or an entirety of an electronic product that can display images, such as a laptop computer. In this embodiment, to explain the spirit of the disclosure, the display device 10 is, for example, a part of a laptop computer (not shown). In such embodiment, the display device 10 may be a display of the laptop computer, and may be correspondingly connected to a host (not shown). In this embodiment, the display device 10 includes a housing 100, a display panel 200, a flexible frame 300, a capturing assembly 400, a first positioning structure 500, a second positioning structure 600 and two reinforcement components 700.

The housing 100 is made of, for example, aluminum. The housing 100 is manufactured by a processing method such as Computer Numerical Control (CNC). The housing 100 may be referred as a rear cover or the so-called "A cover or A shell". In addition, the housing 100 has an accommodation space 101. The display panel 200 is located in the accommodation space 101. In this embodiment, the display device 10 may further include a front cover 150 and two hinges 160. The front cover 150 is attached to a bottom edge of the display panel 200, and may be referred as the so-called "B cover or B shell". Moreover, the front cover 150 is made of, for example, Mylar. The two hinges 160 are disposed on two opposite sides of the housing 100, respectively.

Figure 3:
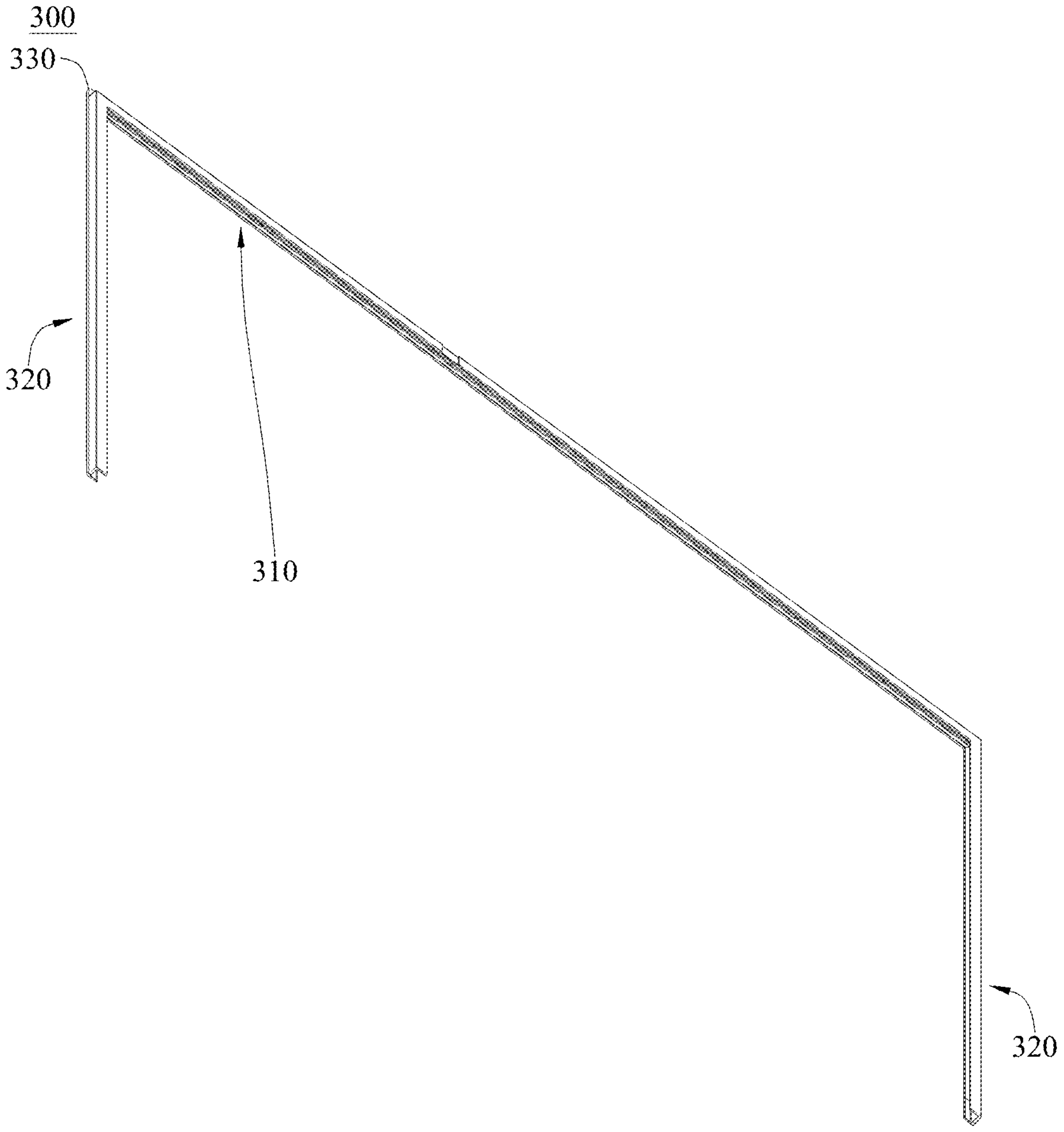
FIG. 3 is a perspective view of a flexible frame of the display device in FIG. 2 from another viewing angle.
Figure 4:
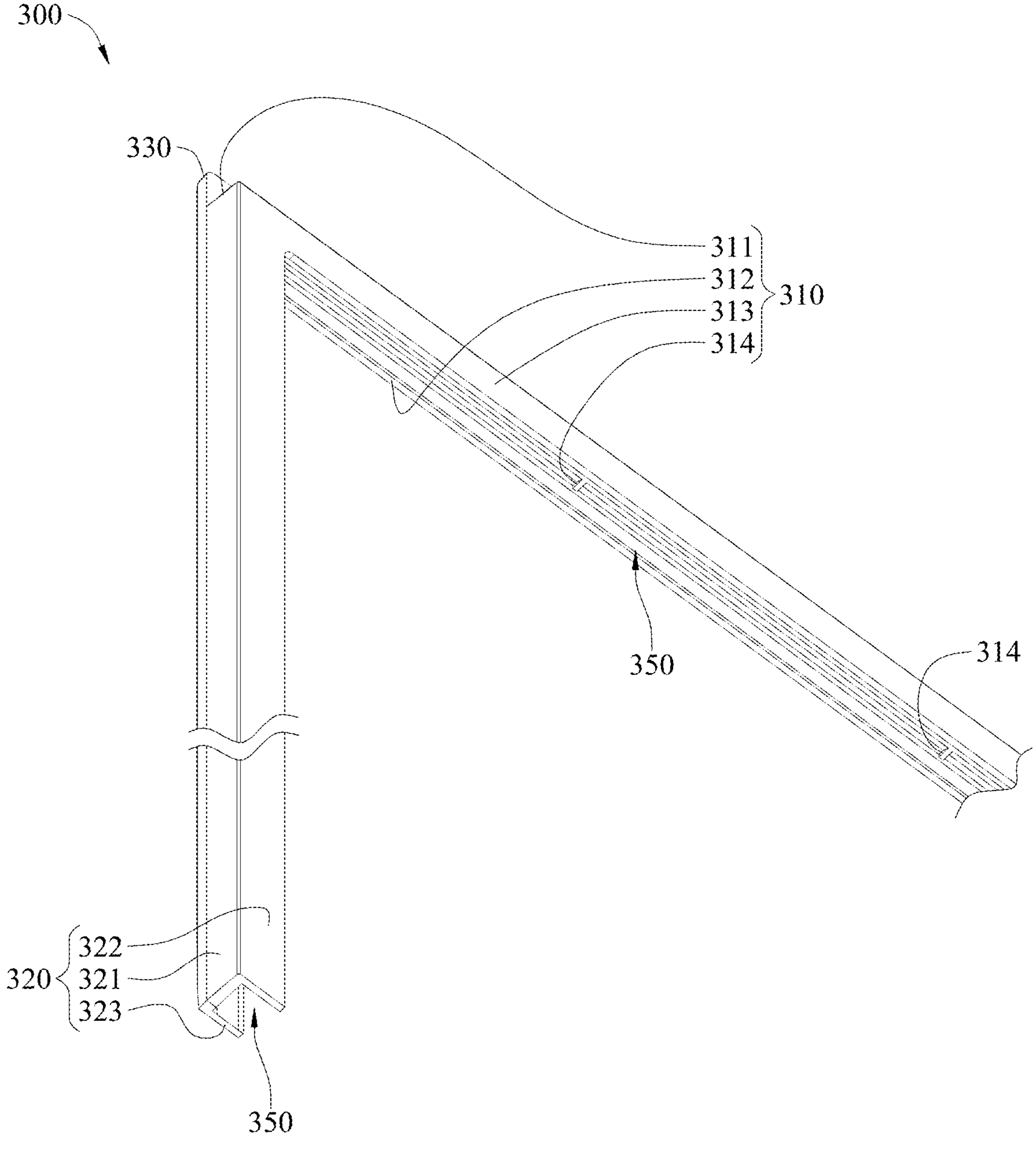
FIG. 4 is a partially enlarged view of the flexible frame in FIG. 3.
Figure 5:
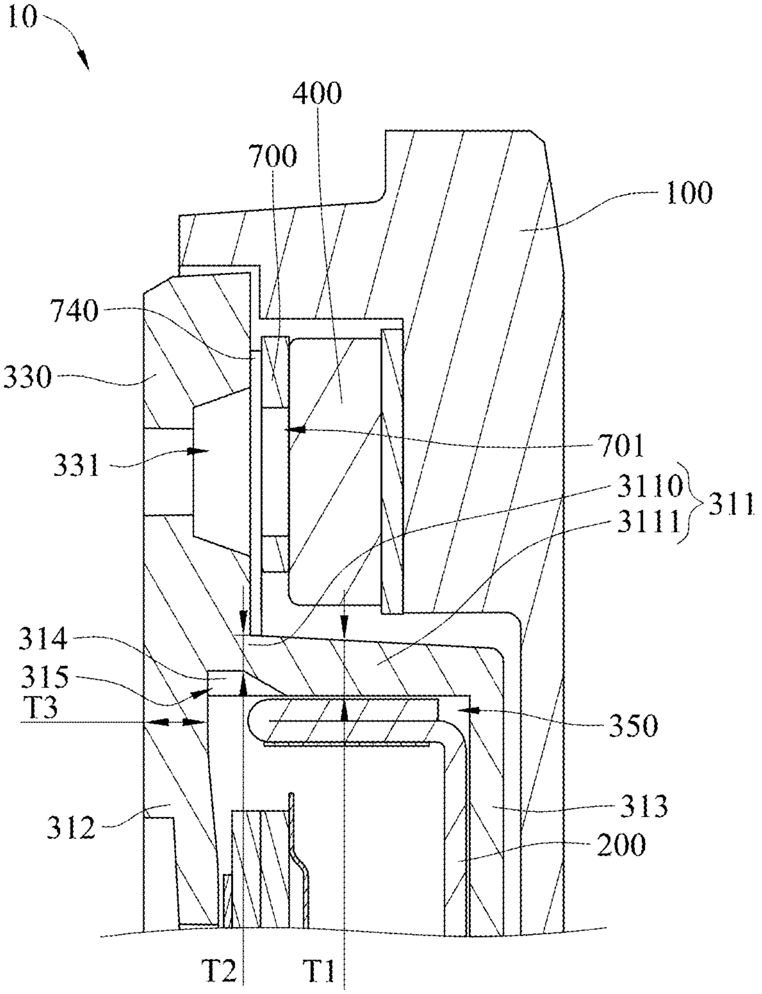
FIG. 5 is a partially enlarged cross-sectional view of the display device taken along line 5-5 in FIG. 1.

Please refer to FIGS. 3 to 5. FIG. 3 is a perspective view of the flexible frame 300 of the display device 10 in FIG. 2 from another viewing angle. FIG. 4 is a partially enlarged view of the flexible frame 300 in FIG. 3. FIG. 5 is a partially enlarged cross-sectional view of the display device 10 taken along line 5-5 in FIG. 1. The flexible frame 300 is, for example, a sealing strip made of a flexible material such as rubber or silicone. The flexible frame 300 is attached to the housing 100 via, for example, an adhesive. The flexible frame 300 includes a first fitting body 310, two second fitting bodies 320 and a covering body 330. The first fitting body 310 and the two second fitting bodies 320 are approximately together in an inverted U-shape, and together form an installation recess 350. The display panel 200 is located in the installation recess 350. In addition, the display panel 200 is attached to the flexible frame 300 via, for example, an adhesive. The first fitting body 310 and the second fitting bodies 320 fit an upper edge and two side edges of the display panel 200, respectively. Therefore, the front cover 150, the first fitting body 310 and the second fitting bodies 320 together cover a periphery of the display panel 200. Further, since the first fitting body 310 and the second fitting bodies 320 cover and fit the display panel 200, the display device 10 has a visual appearance similar to that of display devices adopting a thin bezel design.

In this embodiment, the first fitting body 310 includes a connecting part 311, a first clamping part 312, a second clamping part 313 and a plurality of ribs 314, and the first fitting body 310 has a recess 315.

As shown in FIG. 5, the connecting part 311 includes a narrower portion 3110 and a wider portion 3111 connected to each other. The narrower portion 3110 and the wider portion 3111 are connected to the first clamping part 312 and the second clamping part 313, respectively. That is, the first clamping part 312 and the second clamping part 313 are connected to two opposite ends of the connecting part 311, respectively. Also, the connecting part 311, the first clamping part 312 and the second clamping part 313 are approximately together in, for example, an inverted U-shape. A thickness T1 of the narrower portion 3110 is smaller than a thickness T2 of the wider portion 3111. The recess 315 is located on a position where the narrower portion 3110 and the first clamping part 312 are connected. The ribs 314 are disposed in the recess 315. In detail, different sides of each rib 314 respectively are connected to the connecting part 311 and the first clamping part 312, so as to improve the structural strength of the first fitting body 310. In other embodiments where the demand for the structural strength of the first fitting body is lower, the first fitting body may not include the ribs.

In addition, the thickness T1 of the narrower portion 3110 is, for example, ⅓ to ½ of the thickness T3 of the first clamping part 312. In this embodiment, the thickness T1 is, for example, ½ of the thickness T3.

Since the two second fitting bodies 320 are similar in structure, the detail structure of only one of them will be described below. The second fitting body 320 includes a connecting part 321, a first clamping part 322 and a second clamping part 323. The first clamping part 322 and the second clamping part 323 are connected to two opposite ends of the connecting part 321, respectively. The connecting part 321, the first clamping part 322 and the second clamping part 323 are together in approximately, for example, an inverted U-shape. The first clamping part 322 and the second clamping part 323 are connected to an end of each of the first clamping part 312 and the second clamping part 313 of the first fitting body 310.

The covering body 330 has a plurality of exposing holes 331. In addition, the covering body 330 protrudes from a side of the connecting part 311 away from the installation recess 350. That is, the covering body 330 protrudes outwards to widen a top part of the flexible frame 300. Thus, when the laptop computer including the display device 10 of this embodiment is closed, the widened top part of the flexible frame 300 will be prevented from being deformed due to the pressure if a user holds the display device 10 at a position adjacent to the top part of the flexible frame 300. In this way, the reliability for the flexible frame 300 to separate the display device 10 and the host (not shown) is improved, and the direct friction between the display device 10 and the host is prevented.

Note that since the connecting part 311 includes the narrower portion 3110 connected to the first clamping part 312, a recess is prevented from being formed on a side of the first clamping part 312 or a side of the covering body 330 that is located away from the narrower portion 3110 (i.e., the side of the first clamping part 312 or the side of the covering body 330 that is located away from the narrower portion 3110 is prevented from being shrunk). In other words, due to the recess 315 formed on a position where the narrower portion 3110 and the first clamping part 312 are connected, a recess is prevented from being formed on the side of the first clamping part 312 or the side of the covering body 330 that is located away from the narrower portion 3110 (i.e., the side of the first clamping part 312 or the side of the covering body 330 that is located away from the narrower portion 3110 is prevented from being shrunk). In addition, due to the thickness relationship between the narrower portion 3110 and the first clamping part 312, it is further ensured that a recess is prevented from being formed on the side of the first clamping part 312 or the side of the covering body 330 that is located away from the narrower portion 3110 (i.e., it is further ensured that the side of the first clamping part 312 or the side of the covering body 330 that is located away from the narrower portion 3110 is prevented from being shrunk).

Furthermore, in this embodiment, in order to facilitate the demolding during the manufacture of the flexible frame 300, the recess 315 is designed to be located on a position where the narrower portion 3110 and the first clamping part 312 are connected. However, the disclosure is not limited thereto. In other embodiments, the recess may be located on a position where the narrower portion and the covering body are connected.

Figure 6:
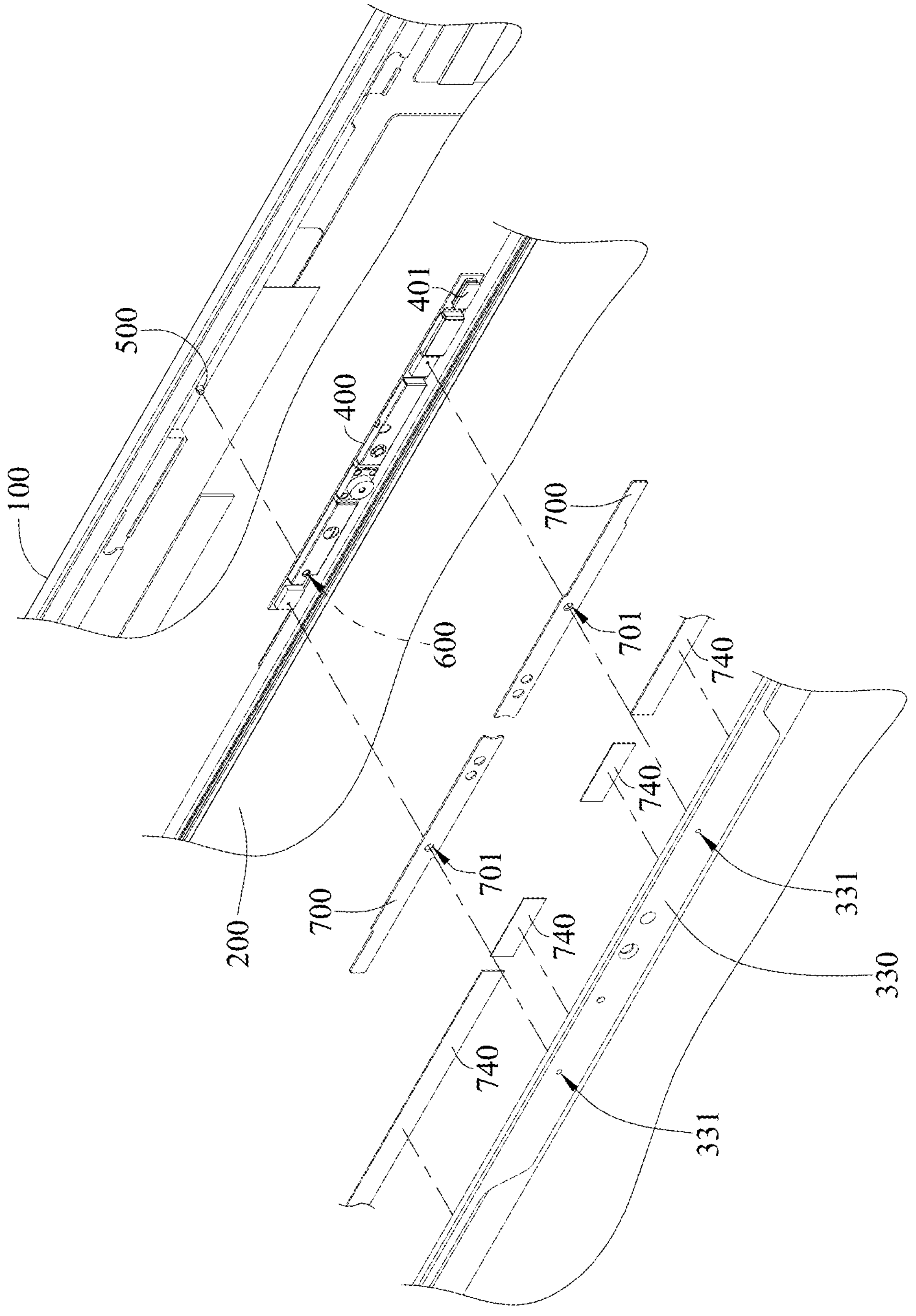
FIG. 6 is a partially enlarged exploded view of the display device in FIG. 1.

Please refer to FIGS. 5 and 6. FIG. 6 is a partially enlarged exploded view of the display device 10 in FIG. 1. The capturing assembly 400 is disposed on the housing 100. Also, the flexible frame 300 is disposed on the housing 100. In detail, the connecting part 311 and the covering body 330 cover, for example, two adjacent sides of the capturing assembly 400, respectively. In addition, the housing 100 covers other two sides of the capturing assembly 400.

Accordingly, the housing 100 and the flexible frame 300 together surround the capturing assembly 400. However, the disclosure is not limited thereto. In other embodiments, the housing may merely cover one side of the capturing assembly, and the flexible frame may cover three adjacent sides of the capturing assembly. That is, in other embodiments, the capturing assembly may be disposed on the flexible frame.

Moreover, the connecting part 311 and the covering body 330 are not limited to covering two adjacent sides of the capturing assembly 400, respectively. In other embodiments, the connecting part and the covering body may cover two different sides of the capturing assembly that is not adjacent to each other.

Additionally, the first fitting body 310, the two second fitting bodies 320 and the covering body 330 are, for example, integrally formed as a single piece by injection molding. Thus, the first fitting body 310, the two second fitting bodies 320 and the covering body 330 have the same appearance. In this way, the display panel 200 and the capturing assembly 400 are respectively covered by the first fitting body 310, the two second fitting bodies 320 and the covering body 330 having the same appearance, which allows the display device 10 to have a uniform appearance.

Further, in this embodiment, it is the covering body 330 of the flexible frame 300 rather than the housing 100 that covers the capturing assembly 400. Thus, the structural complexity of the housing 100 is reduced, thereby facilitating the manufacture of the housing 100 by the processing method such as CNC.

The first positioning structure 500 is located on the housing 100. The second positioning structure 600 is located on the capturing assembly 400. The first positioning structure 500 and the second positioning structure 600 are a positioning protrusion and a positioning hole fitting each other, and are positioned with each other. In this embodiment, the first positioning structure 500 is, for example, a positioning protrusion, and the second positioning structure 600 is, for example, a positioning hole.

Note that in this embodiment, the capturing assembly 400 is mounted on the housing 100 via the first positioning structure 500 and the second positioning structure 600. However, the disclosure is not limited thereto. In other embodiments, the first positioning structure may be located on the covering body of the flexible frame. That is, in other embodiments, the capturing assembly may be mounted on the flexible frame via the first positioning structure and the second positioning structure.

In other embodiments, if the specification of the display device is changed so that the configurations of the capturing assembly and the display panel included in the display device are changed, the positions of the first positioning structure and the second positioning structure may be adjusted so as to allow the flexible frame to be shared among display devices of different specifications.

The two reinforcement components 700 are attached to a side of the capturing assembly 400 that is located closer to the covering body 330 via, for example, an adhesive. In addition, the two reinforcement components 700 each have a plurality of exposing holes 701. The exposing holes 701 are connected to the exposing holes 331, respectively. A hardness of the reinforcement components 700 is, for example, higher than a hardness of the covering body 330. With the two reinforcement components 700, the covering body 330 is allowed to have a flat appearance when being assembled to the capturing assembly 400. Specifically, when the covering body 330 is pressed, the reinforcement components 700 that are harder support the covering body 330 so that the flat appearance of the covering body 330 can be maintained. In addition, the reinforcement components 700 prevent a connector 401 of the capturing assembly 400 from being detached from a circuit board (not labeled) of the capturing assembly 400.

As shown in FIG. 5, in this embodiment, the display device 10 may further include a plurality of assembling components 740 that are, for example, double-sided tapes. The assembling components 740 are located between the covering body 330 and the reinforcement components 700. Also, the assembling components 740 do not cover the exposing holes 331 and 701. In other embodiments, the display device may merely include one assembling component or may not include the assembling component. In addition, in other embodiments, the assembling component may be a pad that is not adhesive.

In addition, the exposing holes 331 and 701 expose the capturing assembly 400. In this embodiment, the capturing assembly 400 includes a camera, and is, for example, a Charge-coupled Device (CCD) assembly. In addition, the capturing assembly 400 may further include one or more of an infrared sensor, a millimeter wave sensor, a microphone, and an eye tracker, and thus may have multiple functions, such as face recognition, sound recording and eye tracking. The capturing assembly 400 is able to receive different types of signals, such as light and sound, from the outside via the exposing holes 331 and 701. In this embodiment, since the flexible frame 300 includes the covering body 330 protruding outwards and covering the capturing assembly 400, the capturing assembly 400 is allowed to be moved from a side of the housing 100 that is located closer to the hinge 160 to a position adjacent to the covering body 330 of the flexible frame 300 that is in the form of a thin bezel. Accordingly, the capturing assembly 400 is disposed on a top part of the display device so as to prevent the range for the capturing assembly 400 to capture signals from being reduced. In this way, the flexible frame 300 allows the display device 10 to adopt a thin bezel design while preventing the range for the capturing assembly 400 to capture signals from being reduced.

In other embodiments, each of the covering body and the reinforcement component may merely have one exposing hole. In addition, in other embodiments, there may merely be one reinforcement component.

Note that the capturing assembly 400 is not limited to including the camera. In other embodiments where the capturing assembly is not demanded to capture images, the capturing assembly may not include the camera.

Please refer to FIGS. 7 to 17 showing an assembling method of the display device 10 in FIG. 1. The assembling method of the display device 10 according to the first embodiment may include following steps.

Figure 7:
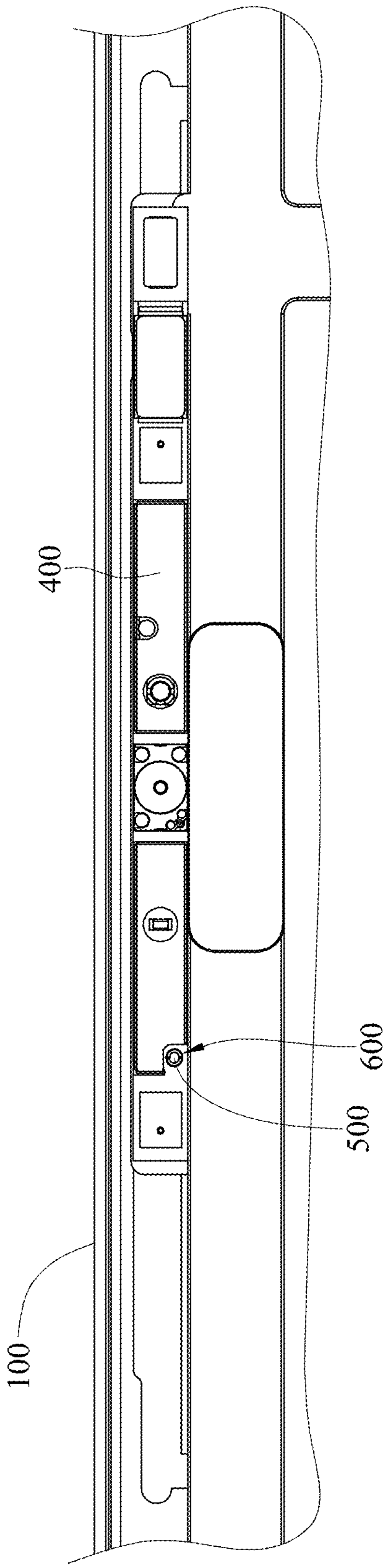
FIGS. 7-17 show an assembling method of the display device in FIG. 1.

As shown in FIG. 7, the housing 100 and the capturing assembly 400 are provided, and the first positioning structure 500 and the second positioning structure 600 are positioned with each other.

Figure 8:
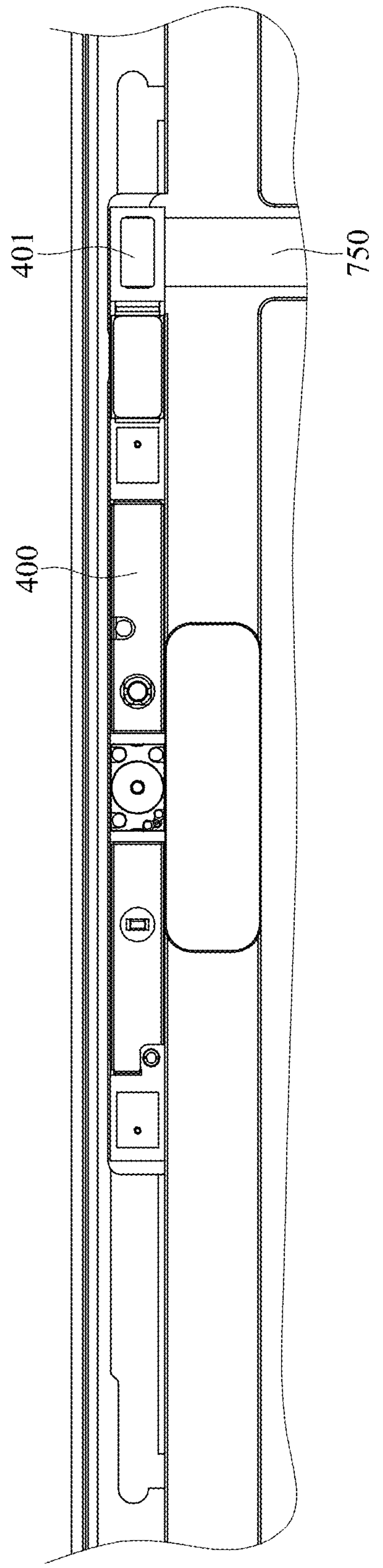

As shown in FIG. 8, a wiring 750 is electrically connected to the connector 401 of the capturing assembly 400.

Figure 9:
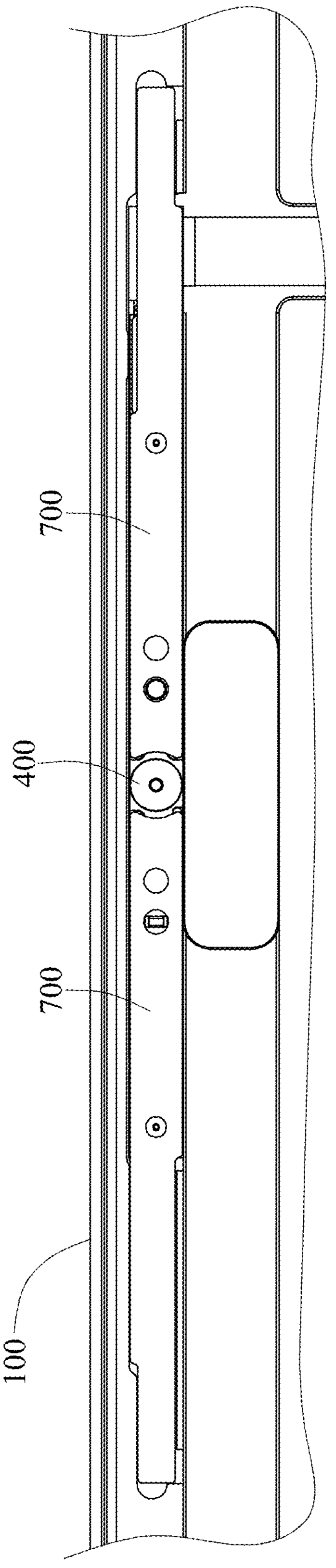

As shown in FIG. 9, the two reinforcement components 700 are attached to a side of the housing 100 and a side of the capturing assembly 400 via adhering.

Figure 10:
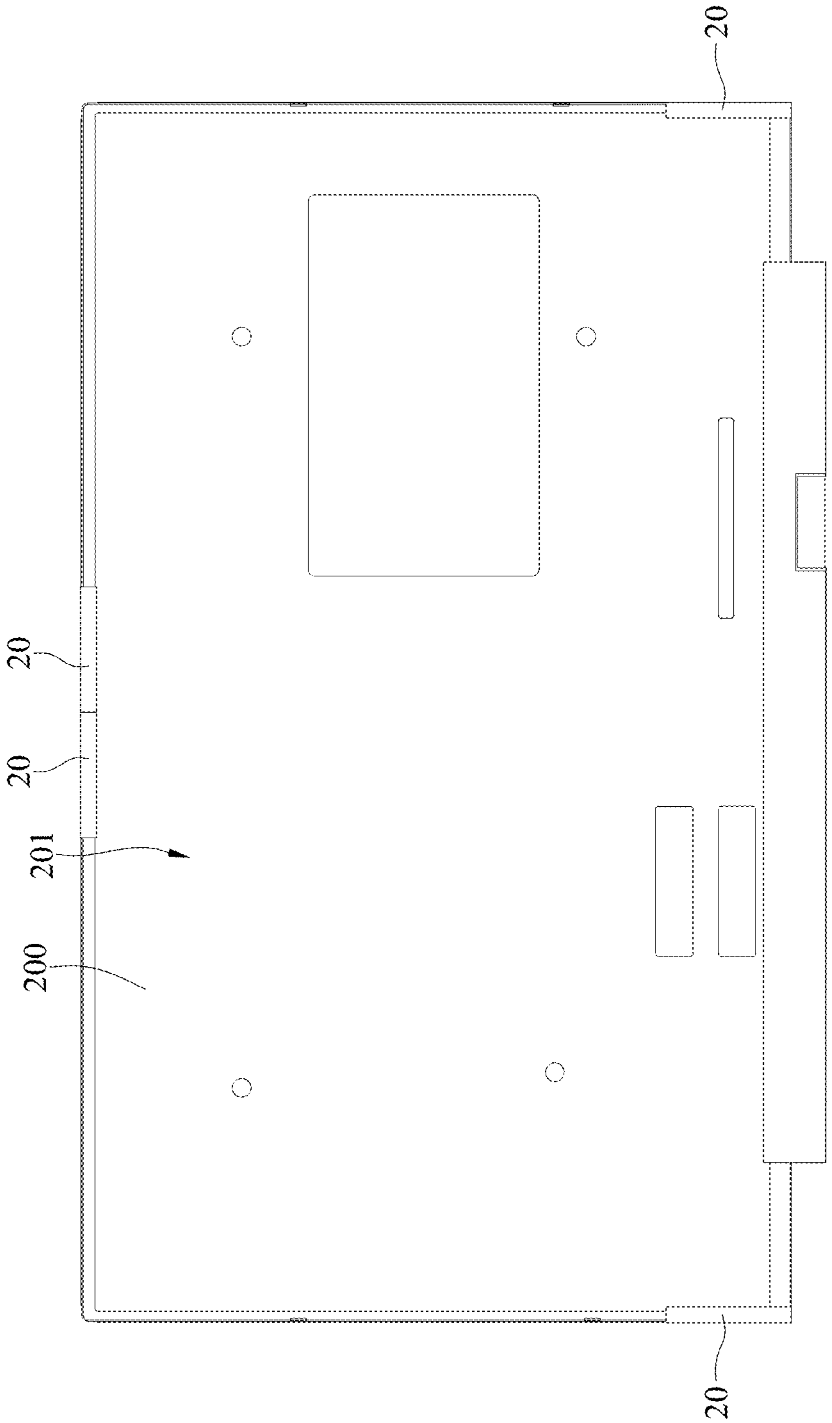

As shown in FIG. 10, a display panel 200 is provided, and a plurality of adhesives 20 are attached on a rear surface 201 of the display panel 200.

Figure 11:
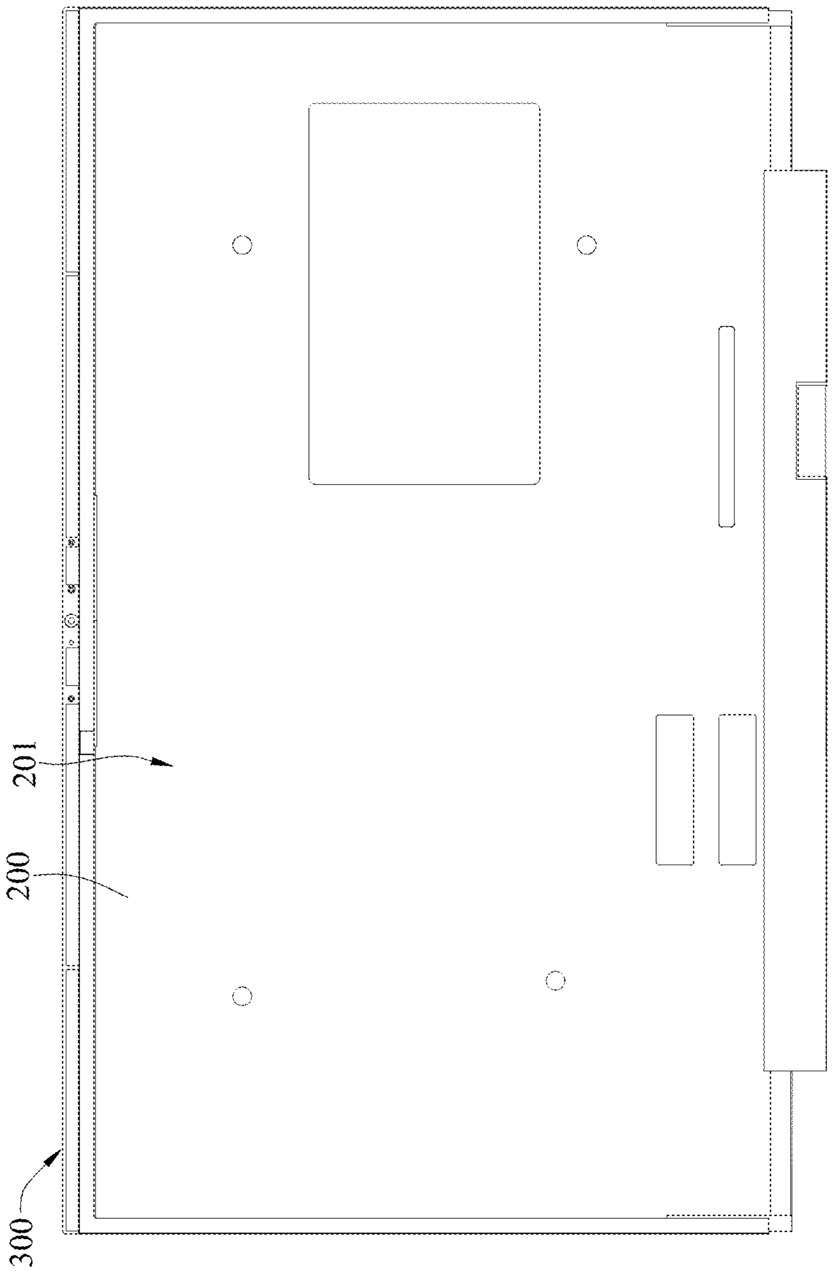

As shown in FIGS. 10 and 11, release papers (not shown) of the adhesives 20 are removed, and the display panel 200 is assembled to the flexible frame 300 via the adhesives 20.

Figure 12:
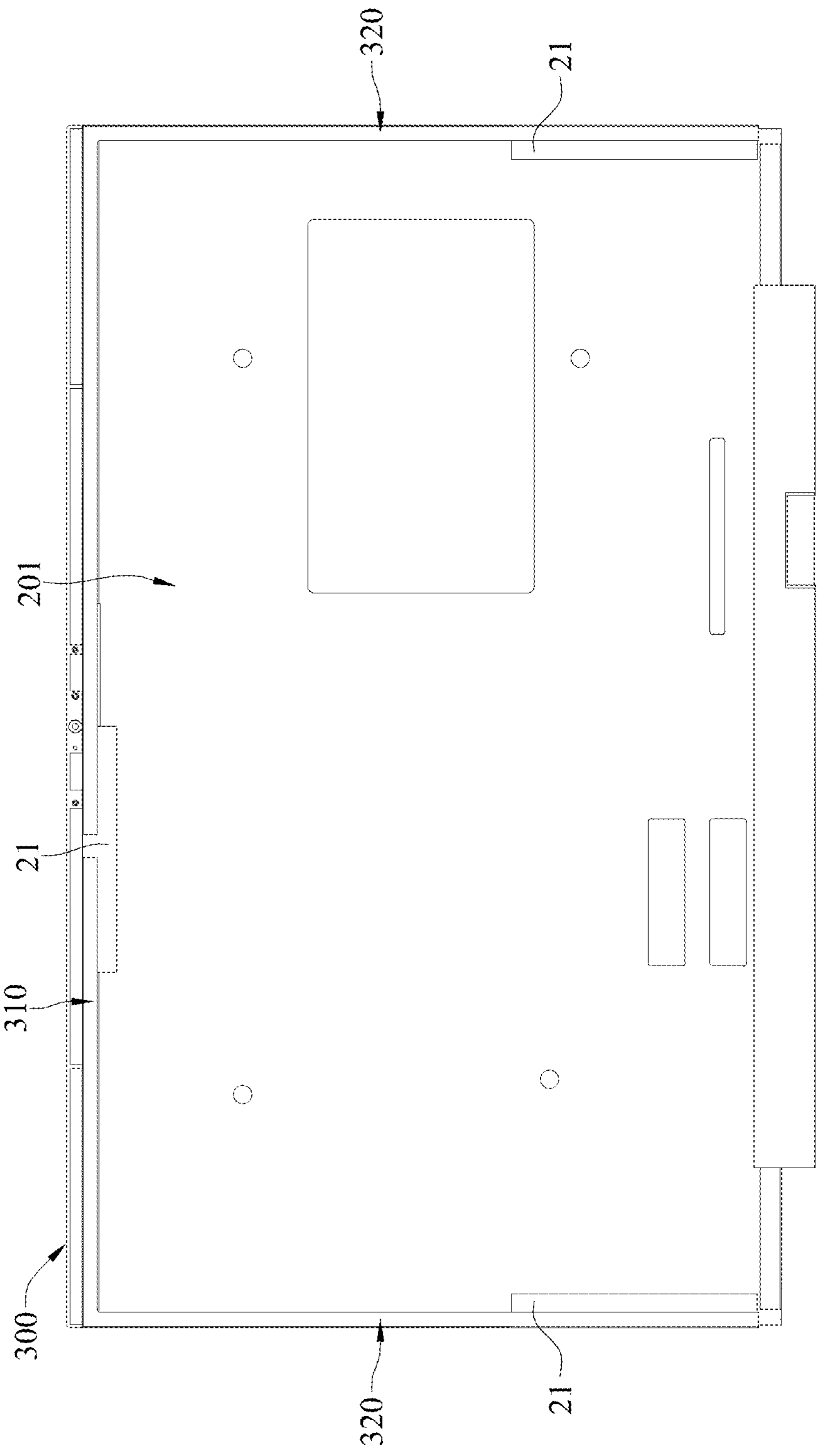

As shown in FIG. 12, a plurality of adhesives 21 are attached to the flexible frame 300.

Figure 13:
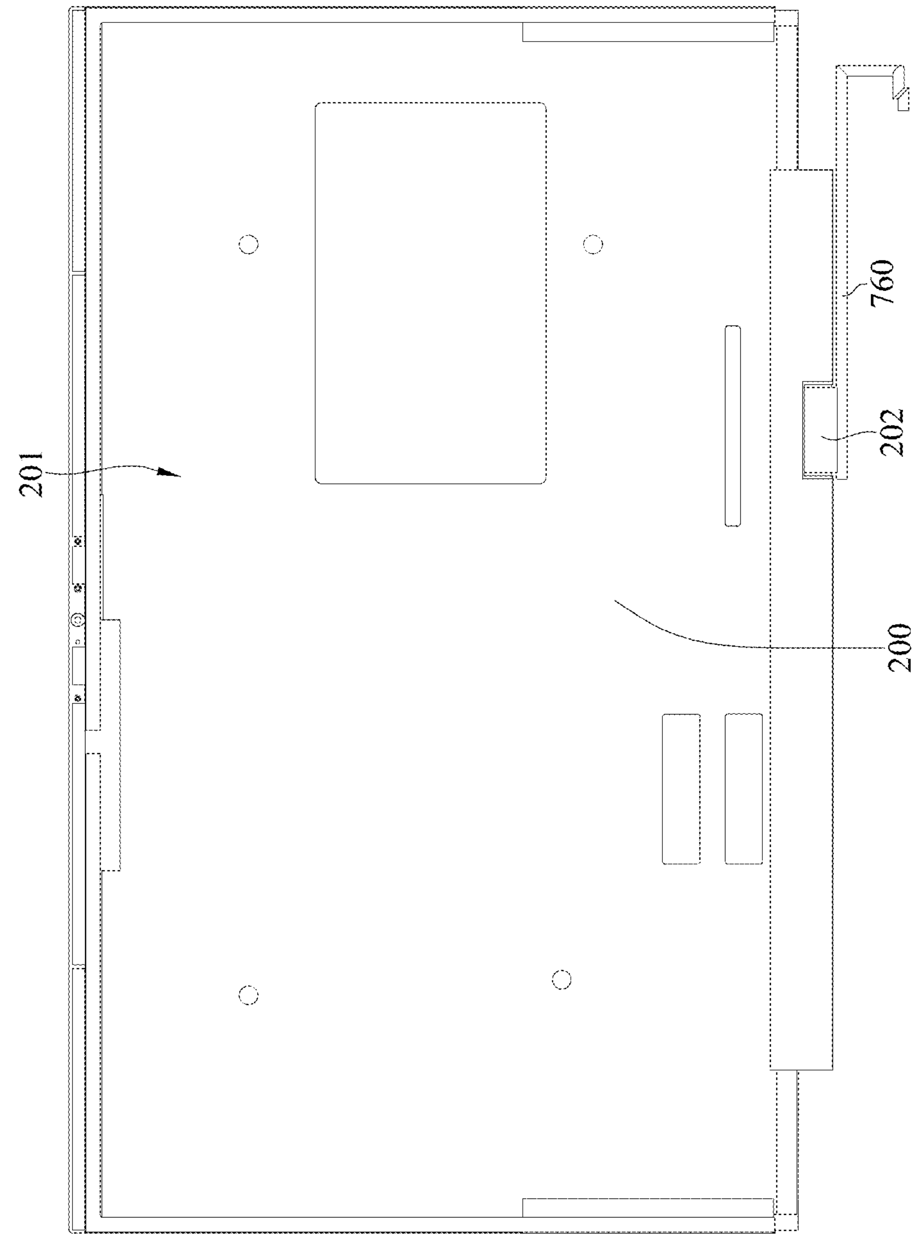

As shown in FIG. 13, a wiring 760 is electrically connected to a connector 202 of the display panel 200.

Figure 14:
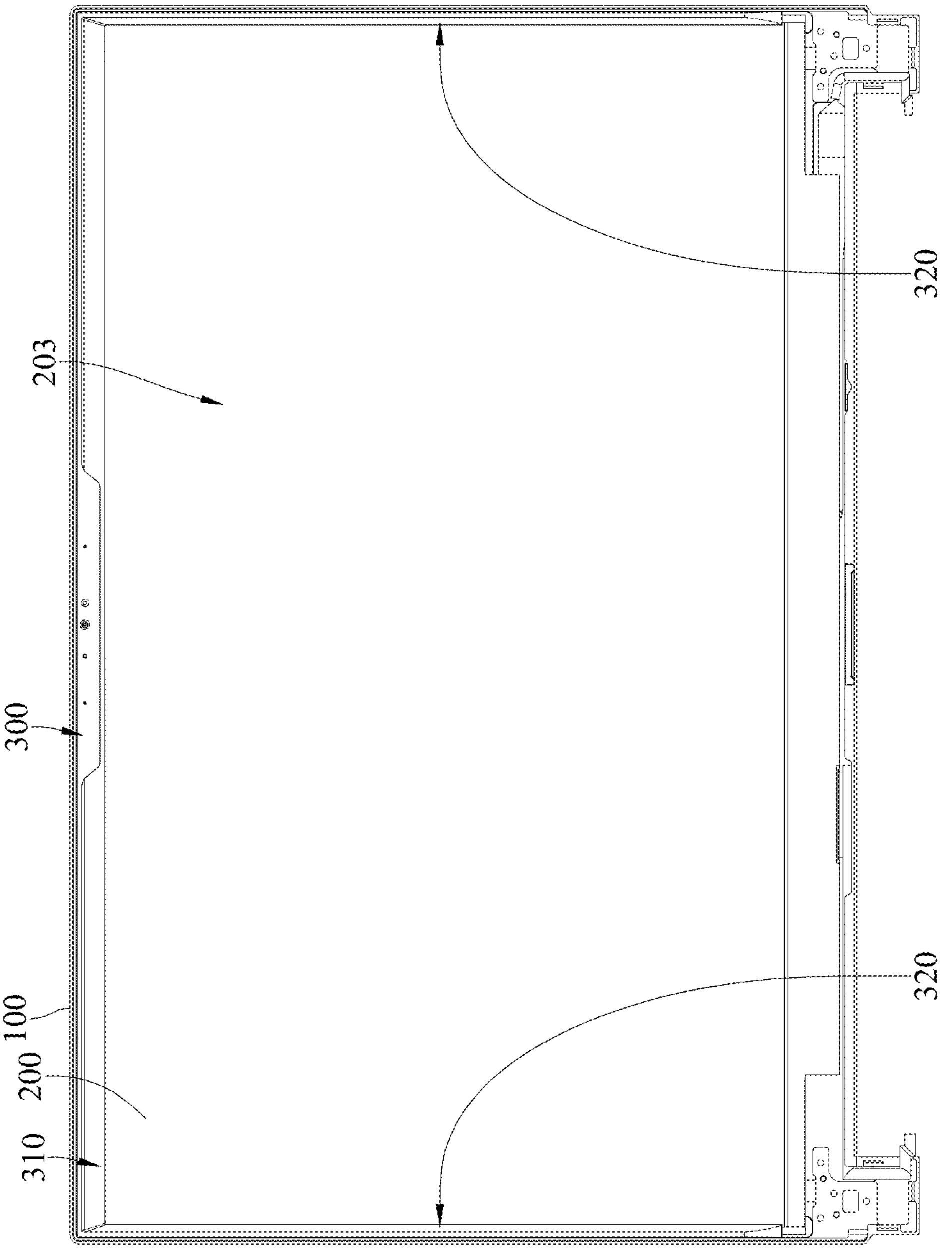

As shown in FIGS. 12 and 14, the display panel 200 and the flexible frame 300 are assembled to the housing 100, such that a front surface 203 of the display panel 200 facing away from the rear surface 201 is exposed to the outside. In detail, firstly, release papers (not shown) of the adhesives 21 attached to the first fitting body 310 are removed, and the first fitting body 310 and the covering body 330 are assembled into the housing 100. Then, release papers (not shown) of the adhesives 21 attached to the second fitting body 320 are removed, and the two second fitting bodies 320 are assembled into the housing 100. In this way, any unnecessary gap between the first fitting body 310 and the housing 100 or that between the covering body 330 and the housing 100 is prevented to maintain the flat appearance of the flexible frame 300. In this embodiment, before being attached to the housing 100, the flexible frame 300 is assembled to and thus supported by the display panel 200. Thus, original assembling processes are maintained so as to reduce the manufacturing costs of the display device 10.

Figure 15:
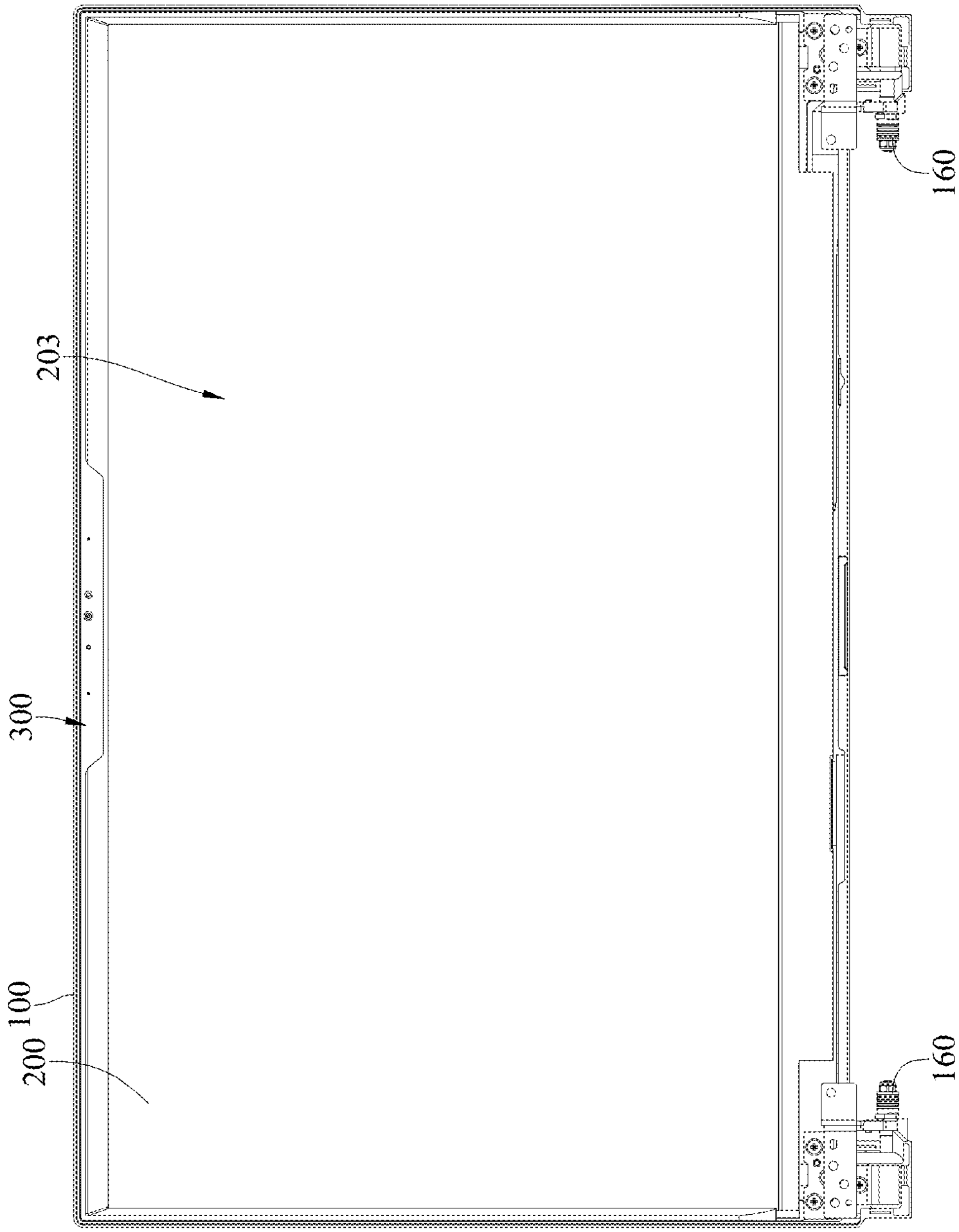

As shown in FIG. 15, the two hinges 160 are fixed to the housing 100 via, for example, screwing.

Figure 16:
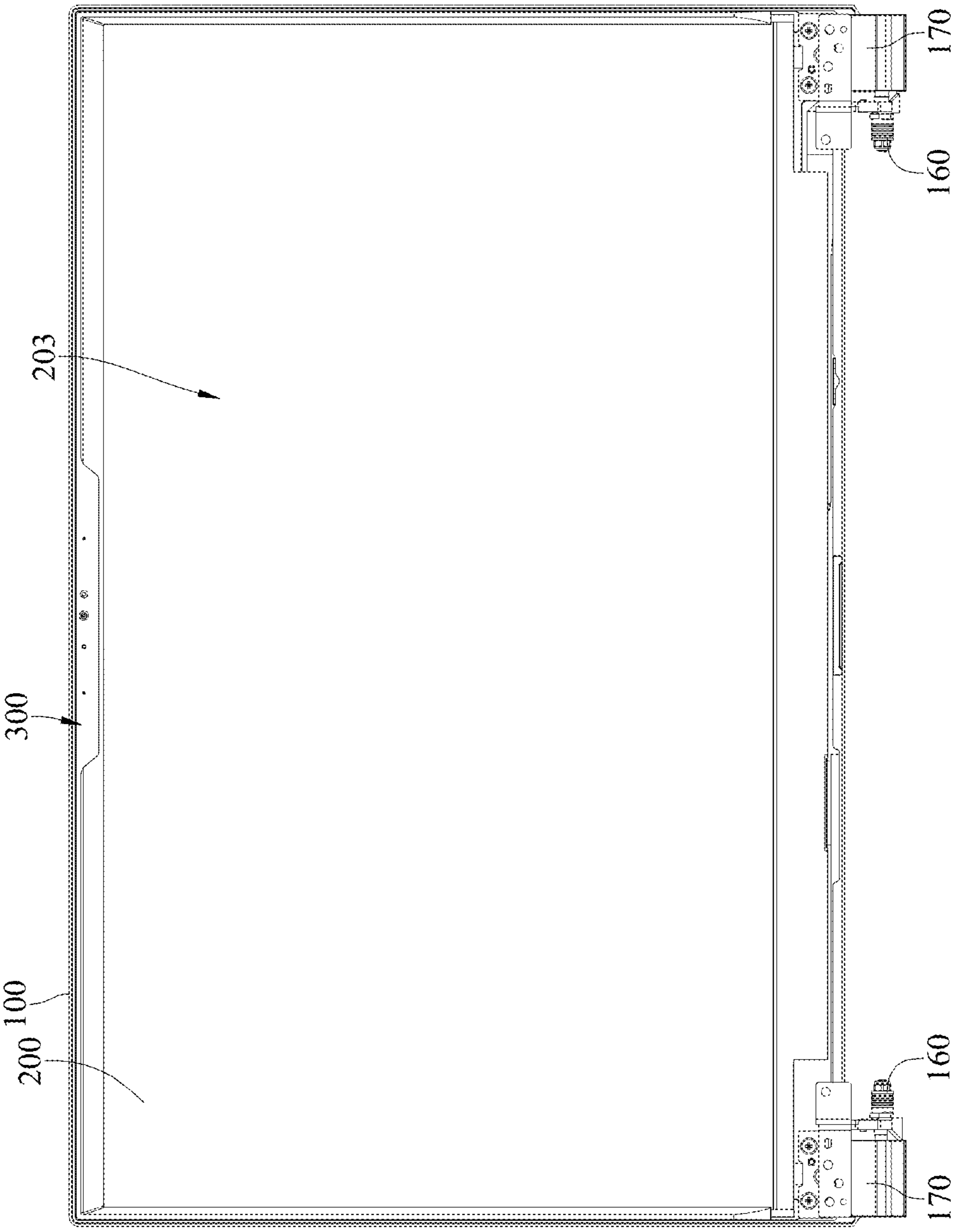

As shown in FIG. 16, two hinge covers 170 are disposed on the housing 100 to respectively cover at least part of the two hinges 160.

Figure 17:
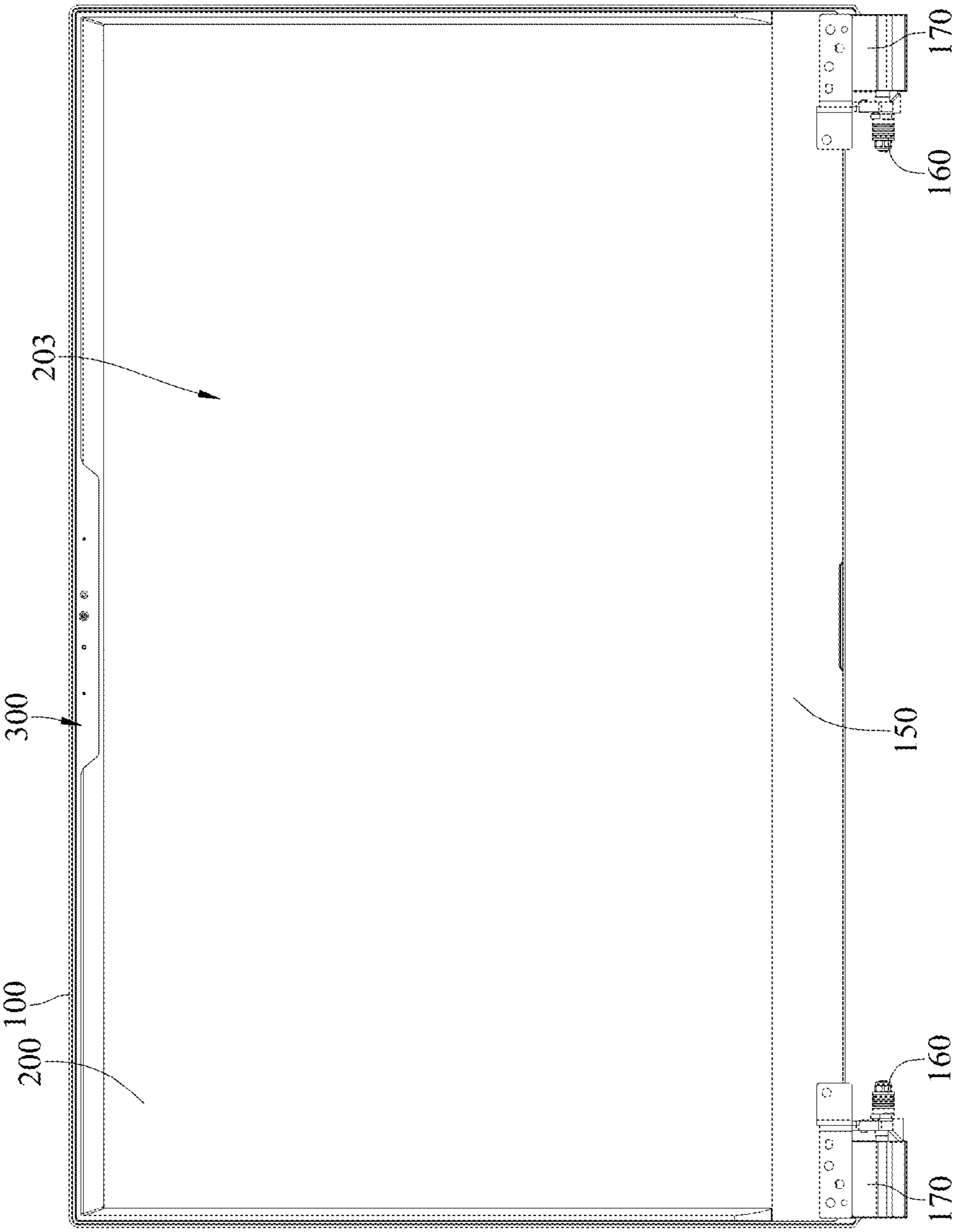

As shown in FIG. 17, the front cover 150 is attached to a bottom edge of the display panel 200. The assembly of the display device 10 is completed so far.

In the first embodiment, the reinforcement components are disposed outside the covering body for the convenience of the assembly, but the disclosure is not limited to the relationship between the reinforcement components and the covering body.

Other embodiments are described below for illustrative purposes. It is to be noted that the following embodiments use the reference numerals and a part of the contents of the above embodiments, the same reference numerals are used to denote the same or similar elements, and the description of the same technical contents is omitted. For the description of the omitted part, reference may be made to the above embodiments, and details are not described in the following embodiments.

Figure 18:
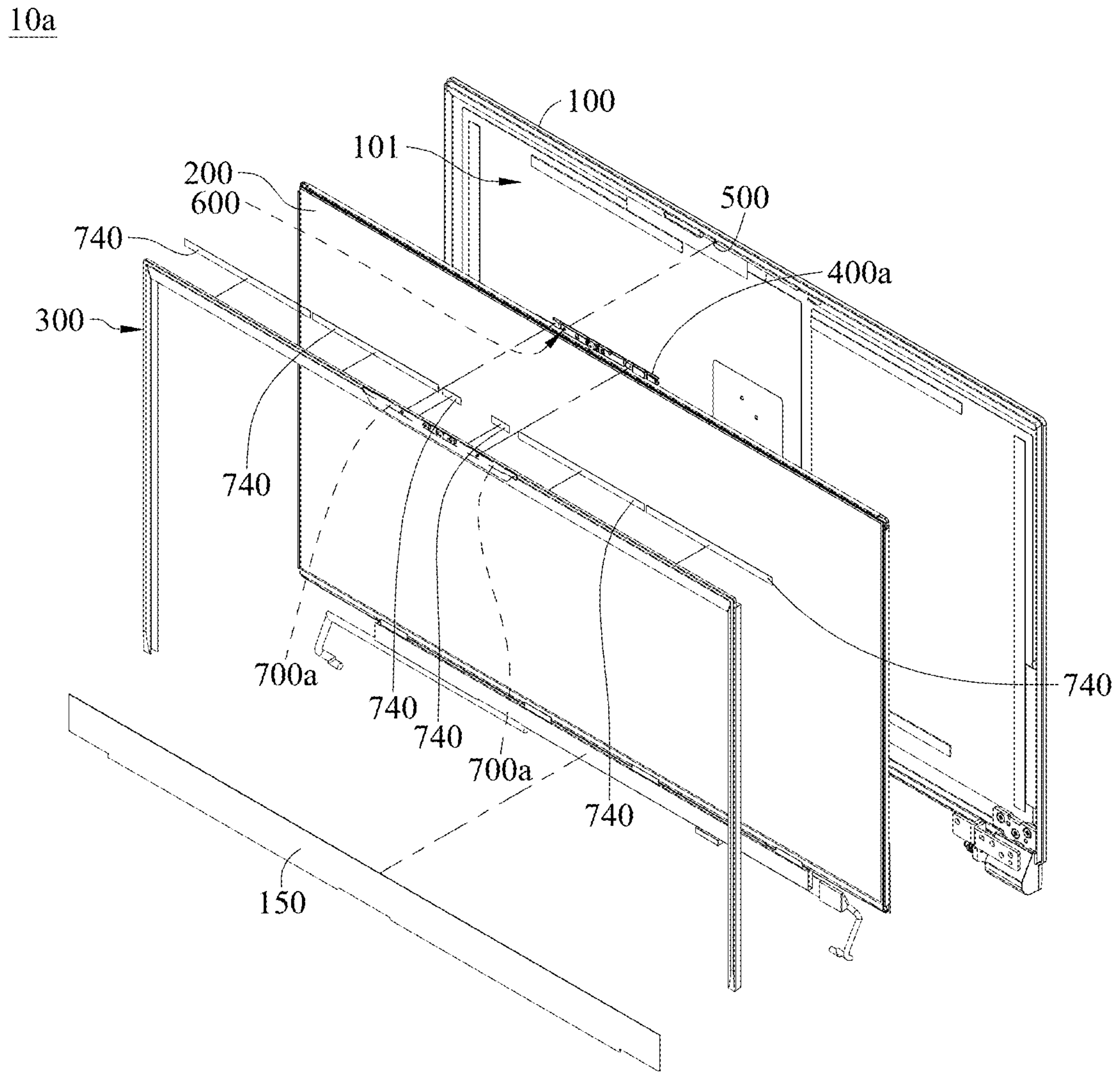
FIG. 18 is an exploded view of a display device according to a second embodiment of the disclosure.
Figure 19:
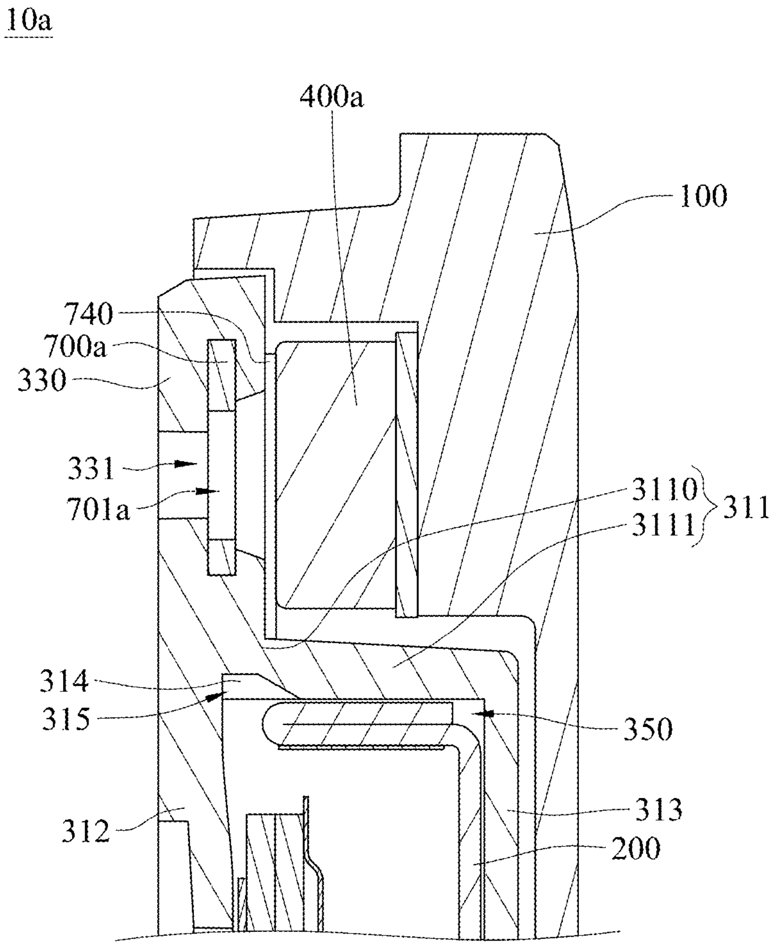
FIG. 19 is a partially enlarged cross-sectional view of the display device in FIG. 18.

Please refer to FIGS. 18 and 19. FIG. 18 is an exploded view of a display device 10*a* according to a second embodiment of the disclosure. FIG. 19 is a partially enlarged cross-sectional view of the display device 10*a* in FIG. 18. Hereinafter, only the difference between the display device 10*a* of this embodiment and the display device 10 of the first embodiment will be described.

In this embodiment, the reinforcement components 700*a* are embedded in the covering body 330. For example, the reinforcement components 700*a* and the flexible frame 300 are together formed by over molding or double injection molding. Exposing holes 701*a* of the reinforcement components 700*a* are located in the exposing holes 331 of the covering body 330. The assembling components 740 are located between the covering body 330 and a capturing assembly 400*a*.

According to the display device and the flexible frame disclosed by above embodiments, since the flexible frame includes the covering body protruding outwards and covering the capturing assembly, the capturing assembly is allowed to be moved from a side of the housing that is located closer to the hinge to the position adjacent to the covering body of the flexible frame that is in the form of a thin bezel. Accordingly, the capturing assembly is allowed to be disposed on the top part of the display device to prevent the range for the capturing assembly to capture signals from being reduced. In this way, the flexible frame allows the display device to adopt a thin bezel design while preventing the range for the capturing assembly to capture signals from being reduced.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A display device, comprising:

a housing, having an accommodation space;

a display panel, located in the accommodation space;

a flexible frame, comprising:

a first fitting body;

two second fitting bodies, connected to two opposite ends of the first fitting body, respectively, wherein the first fitting body and the two second fitting bodies together from an installation recess, and the display panel is located in the installation recess; and a covering body, protruding from a side of the first fitting body facing away from the installation recess and having at least one exposing hole; and a capturing assembly, disposed on the housing, wherein the first fitting body and the covering body cover different sides of the capturing assembly, respectively, and the at least one exposing hole exposes the capturing assembly;

wherein the first fitting body comprises a connecting part, a first clamping part and a second clamping part, the first clamping part and the second clamping part are connected to two opposite ends of the connecting part, respectively, two opposite ends of the first clamping part are connected to the two second fitting bodies, respectively, two opposite ends of the second clamping part are connected to the two second fitting bodies, respectively, the covering body protrudes from a side of the connecting part that is located away from the installation recess, the connecting part and the covering body cover different sides of the capturing assembly, respectively, the first fitting body has a recess, and the recess is located on a position where the connecting part and the first clamping part are connected.

2. The display device according to claim 1, wherein the first fitting body further comprises a plurality of ribs located in the recess.

3. The display device according to claim 1, wherein the connecting part and the covering body cover two adjacent sides of the capturing assembly, respectively.

4. The display device according to claim 1, wherein the connecting part comprises a narrower portion and a wider portion that are connected to each other, the narrower portion and the wider portion are connected to the first clamping part and the second clamping part, respectively, the recess is located on a position where the narrower portion and the first clamping part are connected, a thickness of the narrower portion is smaller than a thickness of the wider portion, and the thickness of the narrower portion is $\frac{1}{3}$ to $\frac{1}{2}$ of a thickness of the first clamping part.

5. The display device according to claim 1, further comprising a first positioning structure and a second positioning structure, wherein the first positioning structure is located on the housing, the second positioning structure is located on the capturing assembly, and the first positioning structure and the second positioning structure respectively are a positioning protrusion and a positioning hole fitting with each other, and are positioned with each other.

6. The display device according to claim 1, further comprising at least one reinforcement component, wherein the at least one reinforcement component is disposed on a side of the capturing assembly that is located closer to the covering body, and a hardness of the at least one reinforcement component is higher than a hardness of the covering body.

7. The display device according to claim 1, further comprising at least one reinforcement component, wherein the at least one reinforcement component is embedded in the covering body, and a hardness of the at least one reinforcement component is higher than a hardness of the covering body.

8. The display device according to claim 1, wherein the capturing assembly comprises a camera.

9. A flexible frame, comprising:

a first fitting body;

two second fitting bodies, connected to two opposite ends of the first fitting body, respectively, wherein the first fitting body and the two second fitting bodies together form an installation recess; and a covering body, protruding from a side of the first fitting body facing away from the installation recess and having at least one exposing hole;

wherein the first fitting body comprises a connecting part, a first clamping part and a second clamping part, the first clamping part and the second clamping part are connected to two opposite ends of the connecting part, respectively, two opposite ends of the first clamping part are connected to the two second fitting bodies, respectively, two opposite ends of the second clamping part are connected to the two second fitting bodies, respectively, the covering body protrudes from a side of the connecting part that is located away from the installation recess, the first fitting body has a recess, and the recess is located on a position where the connecting part and the first clamping part are connected.

* * * * *